US009719466B2

(12) United States Patent
Nakhjavani

(10) Patent No.: US 9,719,466 B2
(45) Date of Patent: Aug. 1, 2017

(54) SYSTEM AND METHOD FOR IMPROVED THRUST REVERSER WITH INCREASED REVERSE THRUST AND REDUCED NOISE

(71) Applicant: The Boeing Company, Chicago, IL (US)

(72) Inventor: Omid B. Nakhjavani, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 14/488,934

(22) Filed: Sep. 17, 2014

(65) Prior Publication Data

US 2016/0076487 A1 Mar. 17, 2016

(51) Int. Cl.
*F02K 1/00* (2006.01)
*F02K 1/82* (2006.01)
*F02K 1/60* (2006.01)
*F02K 1/72* (2006.01)

(52) U.S. Cl.
CPC .......... *F02K 1/827* (2013.01); *F02K 1/60* (2013.01); *F02K 1/72* (2013.01); *Y02T 50/671* (2013.01)

(58) Field of Classification Search
CPC ..... F02K 1/70; F02K 1/72; F02K 1/62; F02K 1/625; F02K 1/64
See application file for complete search history.

(56) References Cited

U.S. PATENT DOCUMENTS

| 5,058,837 A | * | 10/1991 | Wheeler | B64C 23/06 244/198 |
| 6,195,983 B1 | | 3/2001 | Wadia et al. | |
| 6,256,980 B1 | * | 7/2001 | Lecordix | F02K 1/72 239/265.29 |
| 6,382,559 B1 | * | 5/2002 | Sutterfield | B64C 15/02 244/12.4 |
| 6,554,564 B1 | | 4/2003 | Lord | |
| 2016/0052621 A1 | * | 2/2016 | Ireland | B64C 21/04 137/13 |

FOREIGN PATENT DOCUMENTS

GB 794453 A * 5/1958 ............... F02K 1/56

* cited by examiner

*Primary Examiner* — Pascal M Bui Pho
*Assistant Examiner* — Edwin Kang
(74) *Attorney, Agent, or Firm* — Miller, Matthias & Hull LLP

(57) ABSTRACT

A system and method for providing reverse thrust is disclosed. The system can include one or more cascade elements. The one or more cascade elements can each include a plurality of vanes to redirect engine thrust in a forward direction relative to travel. Some, or all, of the vanes can include raised geometric patterns configured to increase the mixing of the airstreams between the reversed engine thrust and the airstream over the vehicle to reduce noise and improve reverse thrust. The angle, curvature, and geometric pattern of the vanes can be optimized for a particular cascade element, engine, location on the engine, row, or can be optimized individually to maximize reverse thrust and minimize noise.

20 Claims, 11 Drawing Sheets

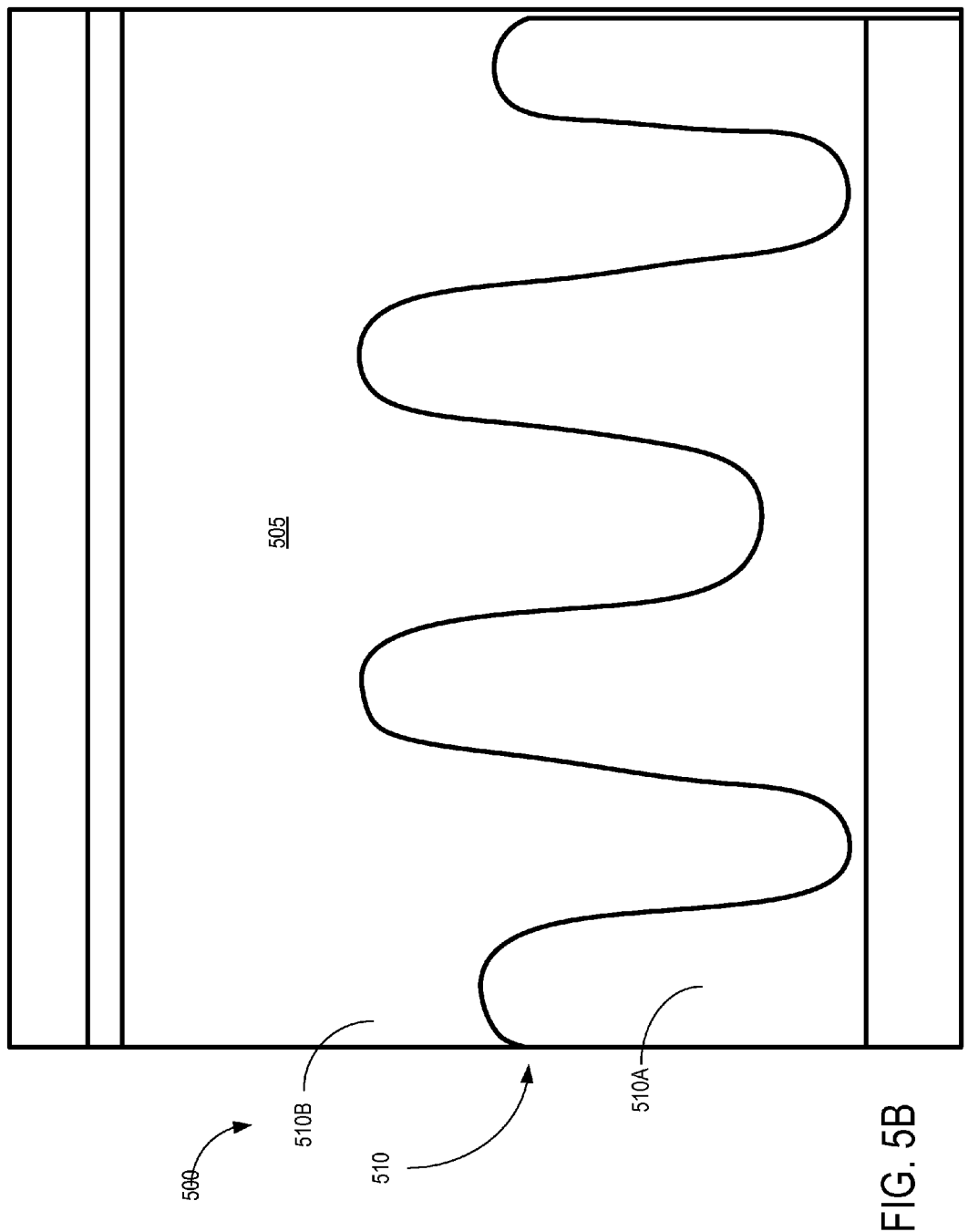

SYSTEM AND METHOD FOR IMPROVED THRUST REVERSER WITH INCREASED REVERSE THRUST AND REDUCED NOISE

BACKGROUND

1. Field of the Disclosure

Embodiments of the present disclosure relate generally to thrust reversers for turbine engines, and more specifically to cascade elements for thrust reverser configured to provide improved reverse thrust and reduced noise.

2. Background of Related Art

Commercial aircraft fly at very high speeds and can be extremely heavy. A fully loaded Boeing 747-400, for example, has a cruise speed of approximately 565 mph and a maximum take-off weight of approximately 833,000 lbs. As a result, the wings are optimized for efficient cruising, with some tradeoff on take-off and landing speeds. 747-400 approach speeds vary between approximately 150-180 mph, depending on payload, temperature, humidity, etc.

Obviously, stopping several hundred thousand pounds from these speeds requires a great deal of braking force. A portion of this energy is absorbed by the braking system and converted to heat, which is then dissipated using ducts and vents. Relying completely on the braking system, however, placed undue stress on the brake rotors and pads, the landing gear, and the tires. As a result, many modern aircraft, including the 747-400, also use thrust reversers.

As the name implies, thrust reversers reverse the thrust from the engine to create braking force. This can shorten landing field length, or the distance within which the plane can safely land, significantly and can reduce brake and tire wear. Thrust reversers can also reduce wear and tear on the landing gear, reducing maintenance, because a portion of the energy required for stopping the aircraft is provided by the engines rather than being transmitted through the landing gear.

A problem with conventional thrust reversers, however, is that they tend to be very loud. This restricts their use to daytime only, for example, in some areas. The blasting, or broadband, noise cause by the reversers can alarm passengers and disturb local residents and wildlife, among other things. In addition, conventional thrust reversers are not particularly efficient at providing reverse thrust (e.g., on the order of 40-45% efficient).

What is needed, therefore, is a thrust reverser system that incorporates features designed to increase the reverse thrust provided by the system, while lowering the noise created thereby. The system should reduce the weight of the system and be cost effective using currently available manufacturing techniques. It is to such a thrust reverser system that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure can include a system for improving the reverse thrust provided by a thrust reverser, while reducing the noise caused thereby. The system can include a plurality of cascade elements with improved angular orientation and geometric features.

Embodiments of the present disclosure can include a cascade element for a thrust reverser. The cascade elements can include a first plurality of vanes, disposed in a plurality of rows, and including a first, raised geometric pattern. In some embodiments, the first, raised geometric pattern can be configured to increase mixing with a first, internal airflow and a second, external airflow to reduce noise and increase reverse thrust.

Embodiments of the present disclosure can also include a thrust reverser having a first cascade element, comprising a first plurality of vanes, each of the first plurality of vanes including a first, raised geometric pattern, and a second cascade element, including a second plurality of vanes, each of the second plurality of vanes including a second, raised geometric pattern. In some embodiments, the first cascade element can be disposed proximate a first end of the engine and the second cascade element can be disposed proximate a second end of the engine. The first, raised geometric pattern and the second, raised geometric pattern can be configured to increase mixing with a first, internal airflow through the engine and a second, external airflow over the aircraft.

Embodiments of the present disclosure can further encompass a method including providing a first cascade element with a first plurality of vanes and providing a second cascade element with a second plurality of vanes. In some embodiments, one or more of the first plurality of vanes and the second plurality of vanes can include a raised, geometric pattern configured to increase mixing with a first, internal airflow (e.g., through the engine) and a second, external airflow (e.g., over the aircraft).

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 5B depicts a detailed, front view of a facing surface of FIG. 5A, in accordance with some embodiments of the present disclosure.

Figure 1A:
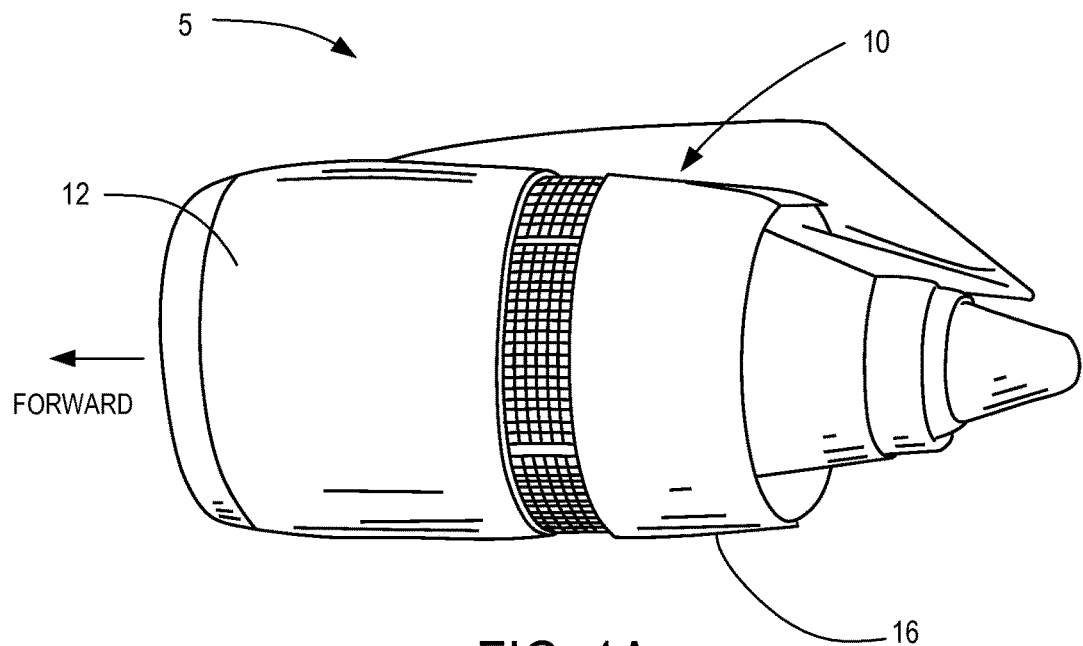
FIGS. 1A-1D depict a conventional turbofan engine with a cascade style thrust reverser.
Figure 1B:
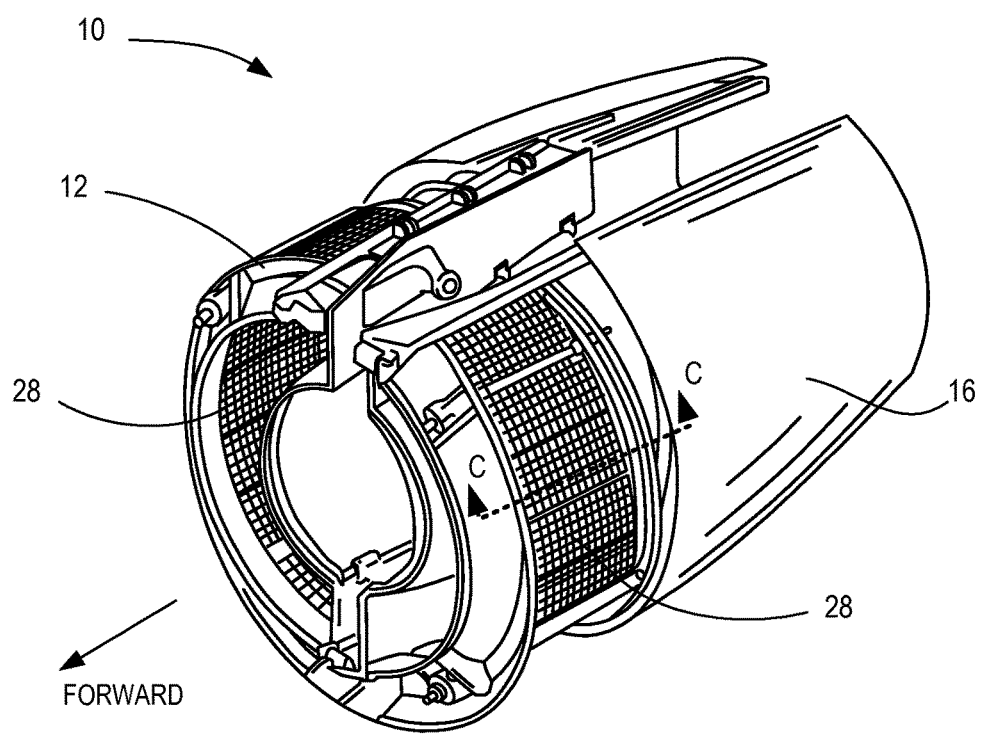
Figure 1C:
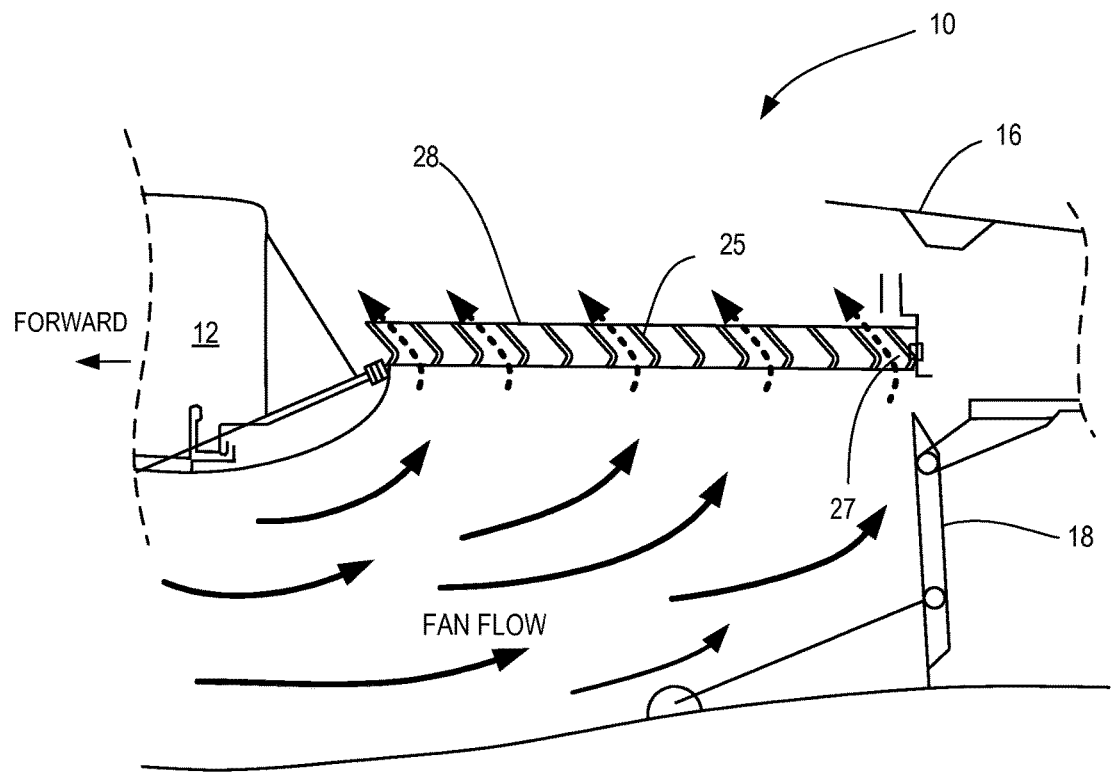
Figure 1D:
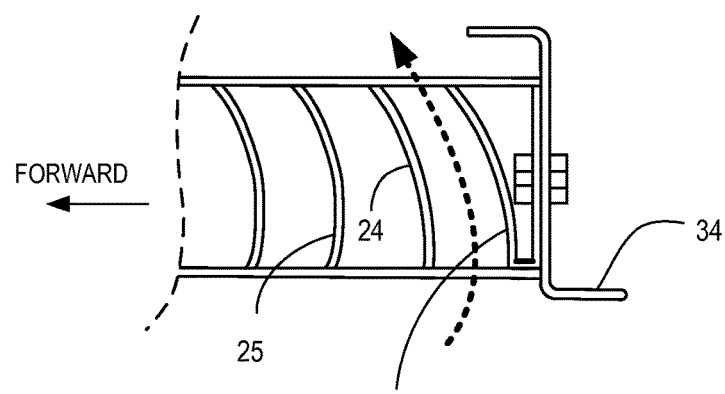

Each figure shown in this disclosure shows a variation of an aspect of the embodiment presented, and only differences will be discussed in detail.

DETAILED DESCRIPTION

Embodiments of the present disclosure relate generally to reverse thrusters, and more particularly to a system and method for use with reverse thrusters utilizing improved geometries configured to reduce noise and improve reverse thrust. In some embodiments, the system can comprise a plurality of vanes that make up a cascade element. Within the cascade element, the surface, shape, curvature, and angle of attack of each vane, or group of vanes, can be improved to provide additional reverse thrust with reduced noise over conventional cascade elements.

To simplify and clarify explanation, the disclosure is described herein as a thrust reverser for turbofan aircraft. One skilled in the art will recognize, however, that the disclosure is not so limited. The system can be used, for example and not limitation, with other types of engines, such as turbojet engines, with minor modification. The disclosure could also be used to improve reverse thrusters on other types of vehicles, such as spacecraft and land vehicles (e.g., turbine powered trains).

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure.

FIGS. 1A-1D depict a conventional cascade style thrust reverser. As shown, the nacelle 12 of a turbofan engine 5 can include a moveable portion 16 that covers a plurality of vents, or cascade elements 28. Inside the nacelle 12 the system comprises a moveable door 18. When the door 18 is deployed, airflow is blocked from exiting the aft portion of the nacelle 12 and instead is redirected through the cascade elements 28. The cascade elements 28, in turn, can include a plurality of vanes 24, 25, 27 configured to turn the flow to produce reverse thrust.

Figure 2A:
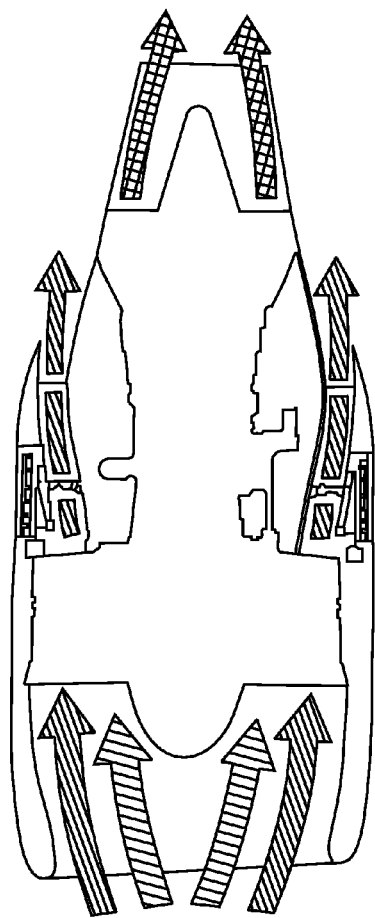
FIGS. 2A and 2B depicts a cascade style thrust reverser in the stowed position (FIG. 2A) and the deployed position (FIG. 2B), respectively.
Figure 2B:
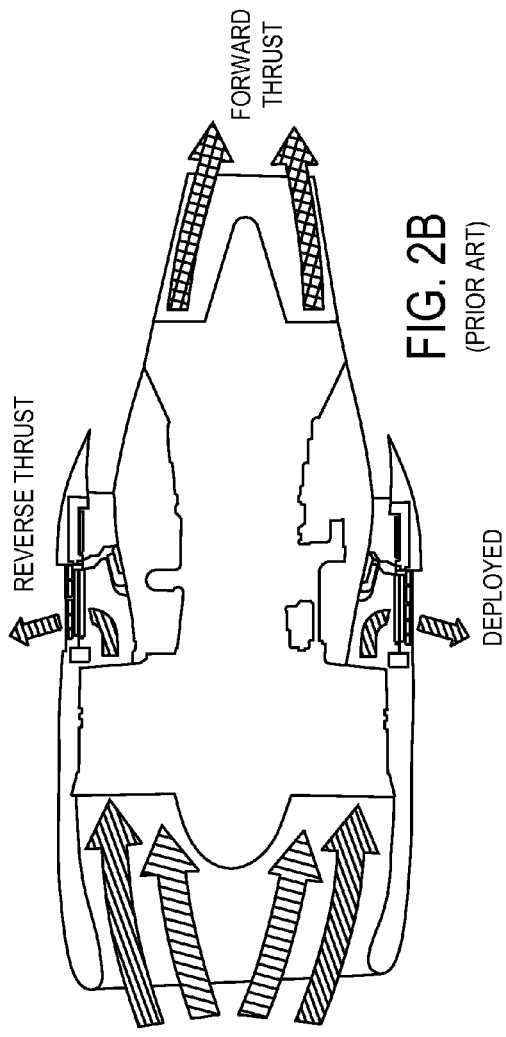

As shown in FIGS. 2A and 2B, a cascade style thrust reverser generally reverses only the portion of the flow provided by the main engine fan, or fan airflow, and not the thrust produced by the engine core, or primary airflow. In this manner, the reverser is redirecting only "cold" fan airflow, which reduces thermal stress on the system, among other things. In addition, in modern high-bypass turbofans, a majority of the thrust is produced by the fan airflow.

Figure 3A:
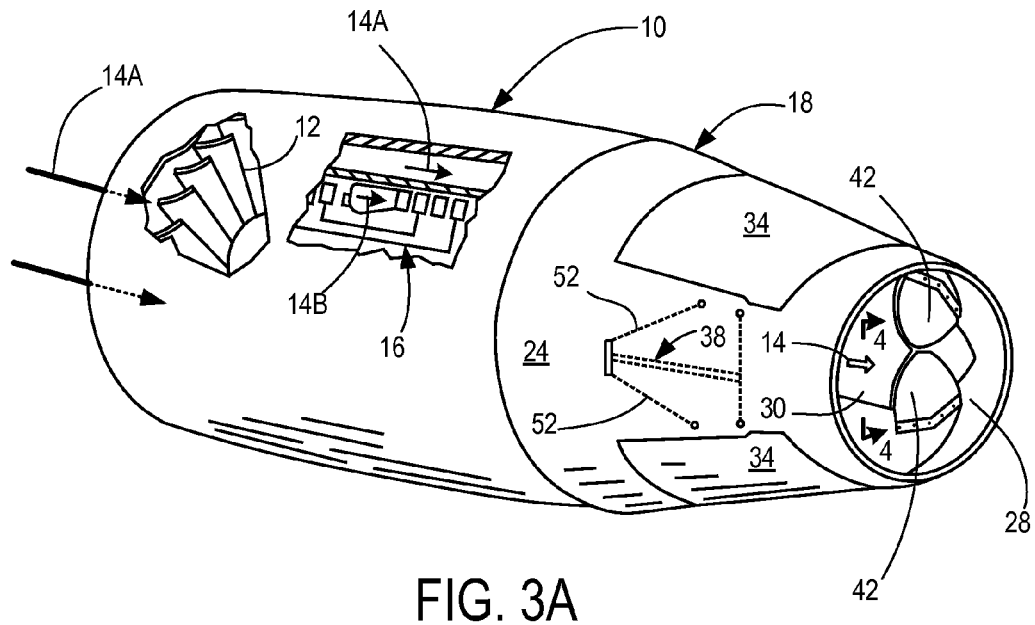
FIGS. 3A and 3B depict a conventional clamshell style thrust reverser on a turbojet engine.
Figure 3B:
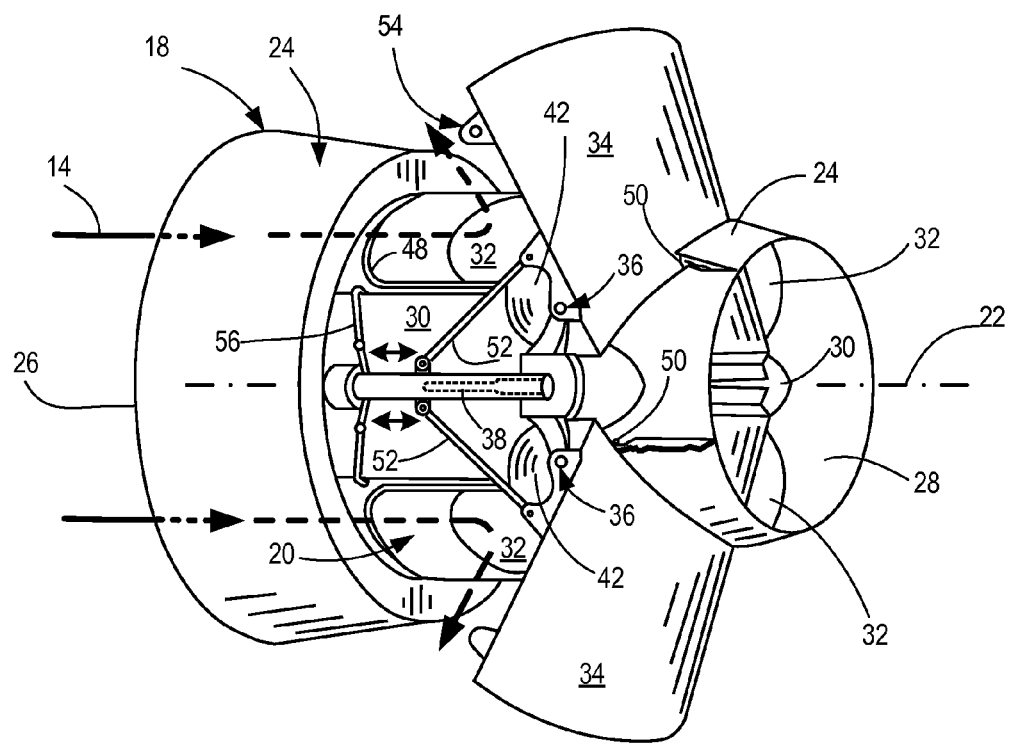

In contrast, as shown in FIGS. 3A and 3B, a clamshell style thrust reverser generally primarily reverses the main flow of the engine and thus, tends to be used on low bypass turbofan or turbojet engines. As shown, in the closed position (FIG. 3A) the reverser doors 34 essentially make up the aft portion 18 of the engine nacelle 10. In the open position (FIG. 3B), on the other hand, the reverser doors 34, partially, or completely, block the main engine flow and redirect it forward to provide reverse thrust. Of course, this is the "hot" main airflow from the engine, including the engine exhaust. As a result, the materials used and/or cooling for the reverser doors 34 must be considered for this type of reverser.

Regardless of the type, however, embodiments of the present disclosure relate to a system and method for providing improved reverse thrust and reduced noise and weight. To this end, embodiments of the present disclosure relate to a system and method for providing an improved cascade element design 400. As discussed above, thrust reversers on turbo fan engines, especially high bypass turbofan engines, tend to be of the cascade design. In this design, multiple cascade elements 400 can be disposed in a circumferential manner around the engine forming one or more rows 405 of vanes 410 around the engine.

When the thrust reverser doors are closed, airflow is rerouted through the cascade elements 400 and reversed to create reverse thrust. This process is very noisy. A portion of this noise is due simply to extremely high airflow through the engine and the energy required to turn the high velocity flow from the engine through approximately 135 degrees (to create reverse thrust). A significant portion of the noise, however, can be abated with proper design of the vanes 410 themselves.

Figure 5A:
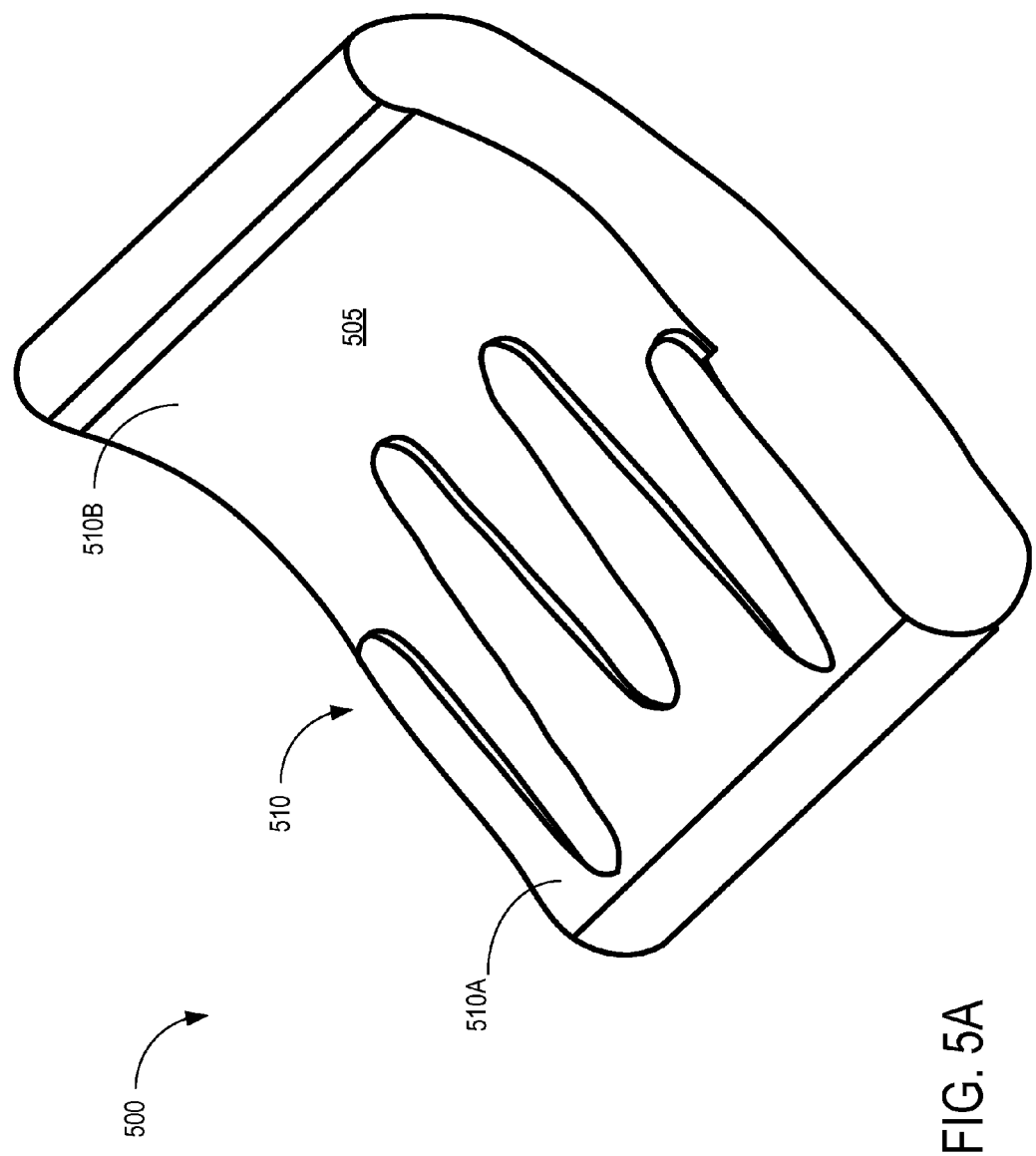
FIG. 5A depicts a detailed, perspective view of a facing surface of the cascade elements with a sinusoidal-type pattern, in accordance with some embodiments of the present disclosure.

As shown in FIGS. 5A and 5B, therefore, in some embodiments, each vane 500, each row of vanes 410, or each vane in a particular cascade element 400 can be specifically designed and optimized for a particular location in the cascade element 400. This can include, for example and not limitation, a pattern 510 on the facing surface 505 (i.e., the face of the vane 500 onto which the airflow impinges) of the vane 500. This pattern 510 can improve the mixing rate of the turbulent shear layer, or the layer of air between (1) the fast-moving, reverse fan airflow from the engine and (2) the forward moving airstream flowing over the aircraft (i.e., due to the aircraft's forward velocity) by increasing turbulence in the reversed flow. In other words, the additional energy caused when the pattern "trips" the reverse airflow provides additional mixing with the forward airstream. The pattern 510 can significantly reduce pressure fluctuations at this junction and thus can reduce "jet" noise, or the blasting noise heard when the reversers are activated, among other things.

In some embodiments, the pattern 510 can comprise a sinusoidal-type pattern and can comprise a raised portion 510a and a recessed portion 510b. This pattern 510 can be produced in many ways, including, but not limited to, additive or subtractive manufacturing, casting, or forging. In some embodiments, material can be removed to form the recessed portion 510b, thus reducing the overall weight of the cascade element. In other words, the recessed portions 510b of the cascade element 400 can be thinner than the remainder of the element reducing the weight of each vane 500. In some embodiments, depending on engine design and size, among other things, the overall weight savings can be between approximately 15-35% over conventional cascade elements. Of course, sinusoidal patterns 510 with a different amplitude or frequency could be used to provide additional tuning.

Figure 6A:
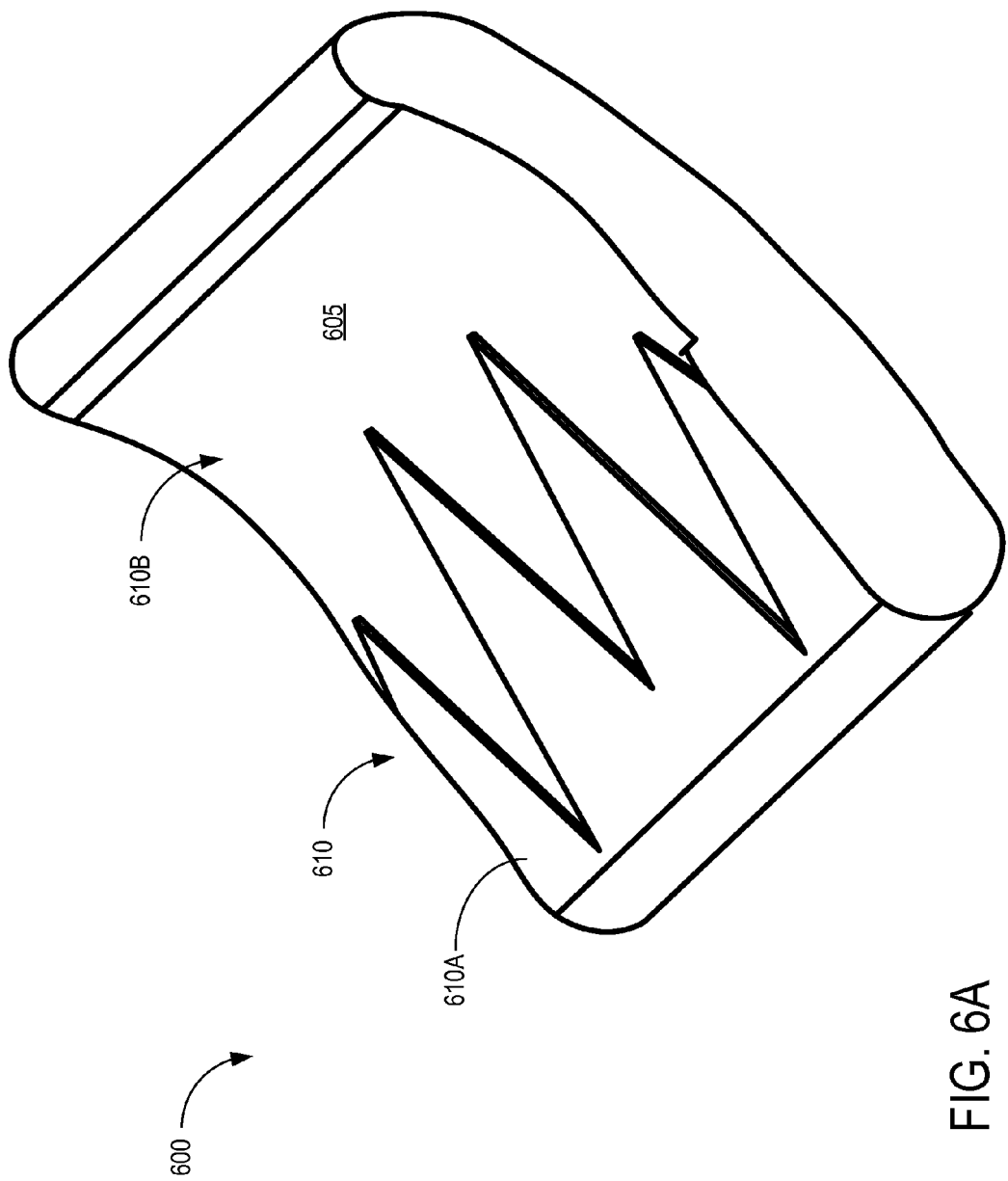
FIG. 6A depicts a detailed, perspective view of a facing surface of the cascade elements with a sawtooth-type pattern, in accordance with some embodiments of the present disclosure.
Figure 6B:
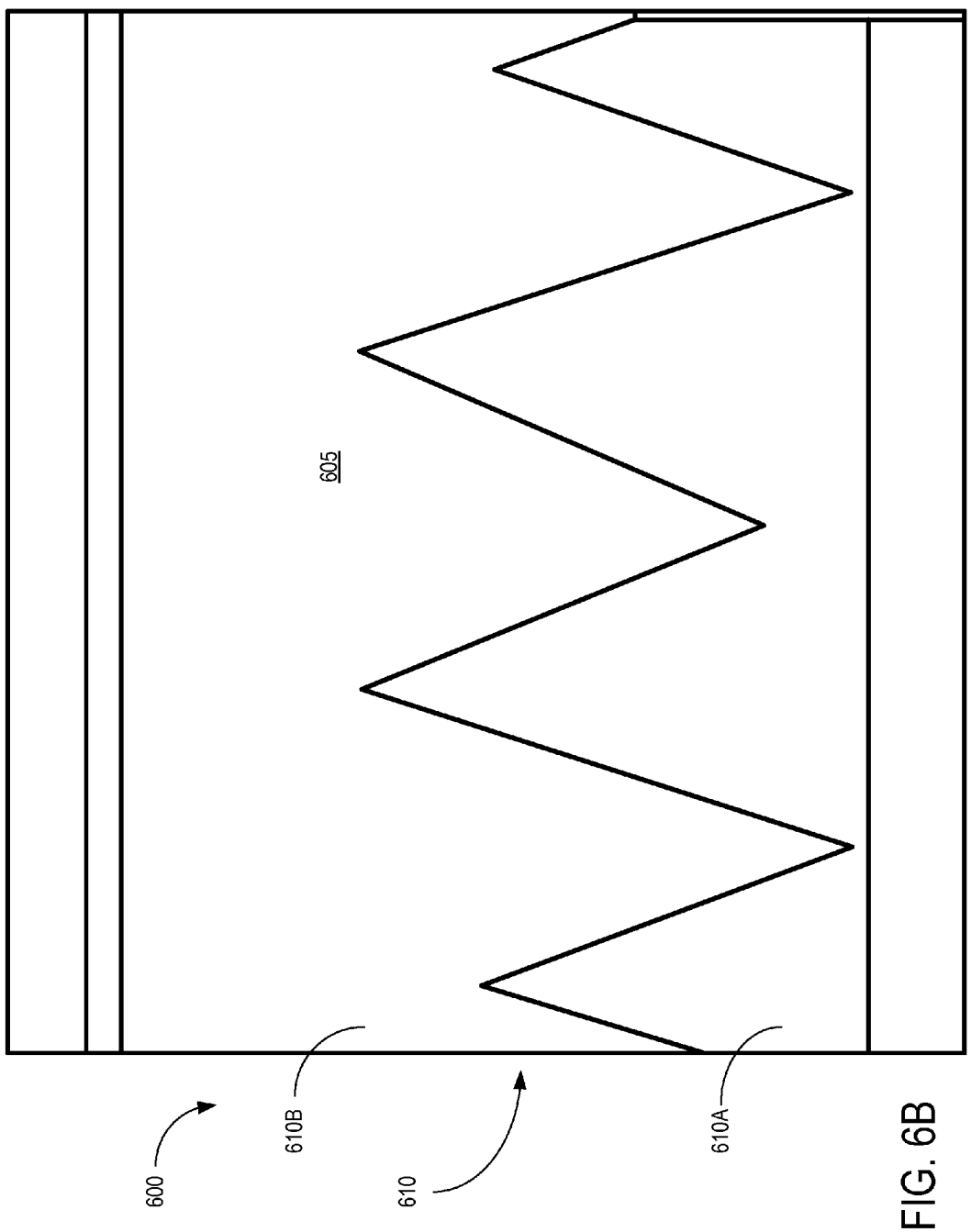
FIG. 6B depicts a detailed, front view of a facing surface of FIG. 6A, in accordance with some embodiments of the present disclosure.

In other embodiments, as shown in FIGS. 6A and 6B, the vane 600 can comprise a saw tooth pattern 610 on the facing surface 605 of the vane 600. Similar to the sinusoidal pattern 510 discussed above, the pattern 610 can improve the mixing rate of the turbulent shear layer, or the layer of air between the fast-moving, reverse fan airflow from the engine and the forward moving airstream flowing over the aircraft. Due to the more extreme transitions in the saw tooth pattern 610, mixing can be increased, but some additional broadband noise can be caused by the pattern 610 itself. This may be effective, however, at lower flow rates, where there is less energy in the flow to promote mixing (e.g., in a cascade element at the rear of the engine). As with the sinusoid-type pattern 510, sawtooth patterns 610 with a different amplitude or frequency could also be used to provide additional tuning.

The patterns, curvature, and thickness of the blades in each cascade element can be optimized for a particular engine size, efficiency, or location, for example. In general, the more curved the pattern is (e.g., sinusoidal), the better the noise reduction, but sharper edged patterns (e.g., saw-toothed) provide reduced overall weight. So, for example, the design of the cascade elements may be different for commuter planes, where noise may be more of a concern, for example, than for long haul planes, where weight and efficiency are paramount.

Figure 4:
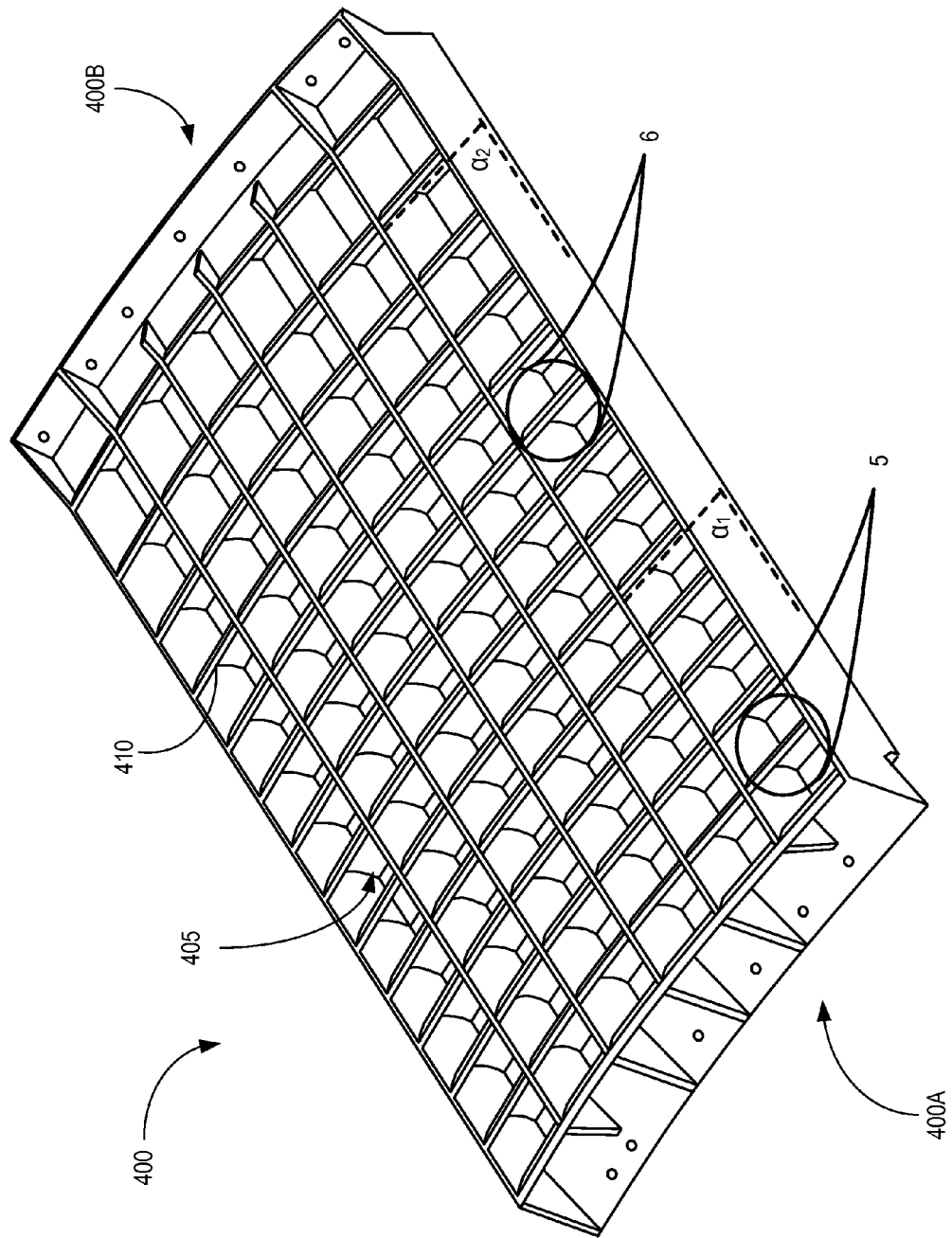
FIG. 4 depicts a cascade element, in accordance with some embodiments of the present disclosure.

Referring back to FIG. 4, the angle of attack, a, the curvature, and the surface pattern 510, 610 can be optimized for each particular location or portion of the cascade element 400. In some embodiments, the vanes 500, 600 for the cascade elements 400 toward the front 400a of the engine (e.g., the intake side), for example, can be different than cascade elements proximate the rear 400b of the engine (e.g., the exhaust side). In other embodiments, the vanes 500, 600 can be customized for each row 405 in a cascade element 400, or even each individual vane 410 in a cascade element 400. In some embodiments, for example, the smoother sinusoidal vane 500 can be used towards the front of the cascade element 400a, where the airflow rate and volume is high to provide additional noise suppression. The more aggressive saw tooth pattern vanes 600, on the other hand, may be more useful toward the rear of the cascade element 400b, where the airflow has a lower velocity and volume, to provide additional weight savings.

Similarly, the angle of attack, $\alpha_1$, of the vanes 410 proximate the front 400a of the cascade element 400, can be different than the angle of attack, $\alpha_2$, those rear of the cascade element 400b. In some embodiments, $\alpha_1$ can be smaller (i.e., shallower), while $\alpha_2$, can be larger (i.e., steeper). In this manner, the reverse thrust produced by the vanes 410 located proximate the rear of the cascade 400b can be similar to that provided by the vanes 410 located proximate the front of the cascade 400a, despite the fact that the flow in this location may be somewhat diminished. Moreover, the additional noise that may be produced by the more aggressive angle of attack, $\alpha_2$, in some conditions, can be substantially offset by the reduced flow velocity and volume toward the rear of the cascade element 400b (or toward the rear of the engine).

As shown, the curvature of the vanes 410 can also vary from the front of the cascade element 400a to the rear of the cascade element 400b. In some embodiments, for example, the vanes 410 can increase in curvature as they move from the front of the cascade element to the rear of the cascade element. Similar to increasing the angle of attack, the additional noise that may be produced by the more aggressive curvature can be substantially offset by the reduced flow velocity and volume toward the rear of the cascade element 400b (or toward the rear of the engine).

Figure 7:
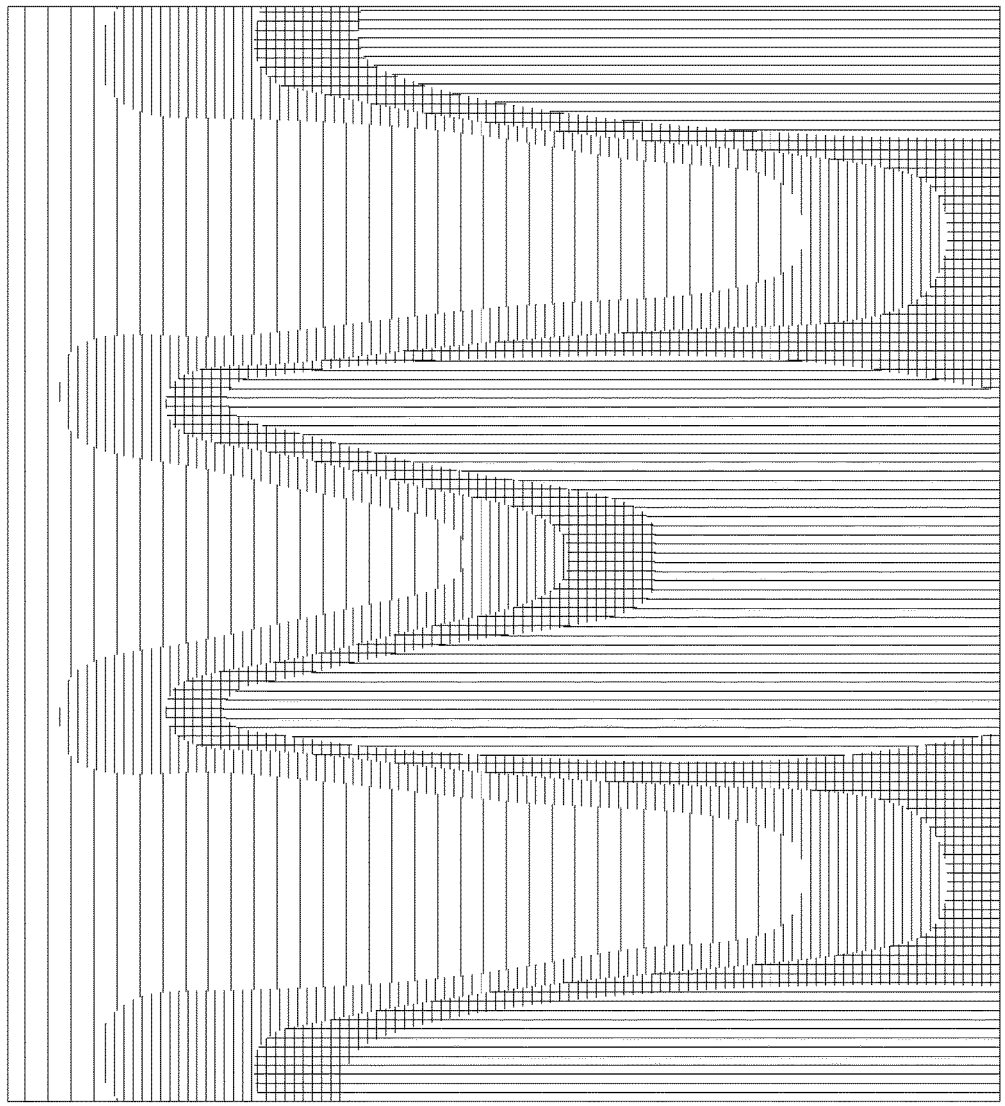
FIG. 7 is a finite element analysis of flow over the facing surface of FIG. 5A, in accordance with some embodiments of the present disclosure.

As shown in the Computational fluid dynamics (CFD) simulation shown in FIG. 7, noise is reduced when the curvature of the pattern is increased. The noise is depicted as light colored "halos" around the pattern, but fades quickly to dark, relatively calm flow. As discussed above, therefore, a highly curved pattern can minimize noise, while a more angular pattern has somewhat less of a quieting effect, but can reduce overall weight.

EXAMPLE

Figure 8A:
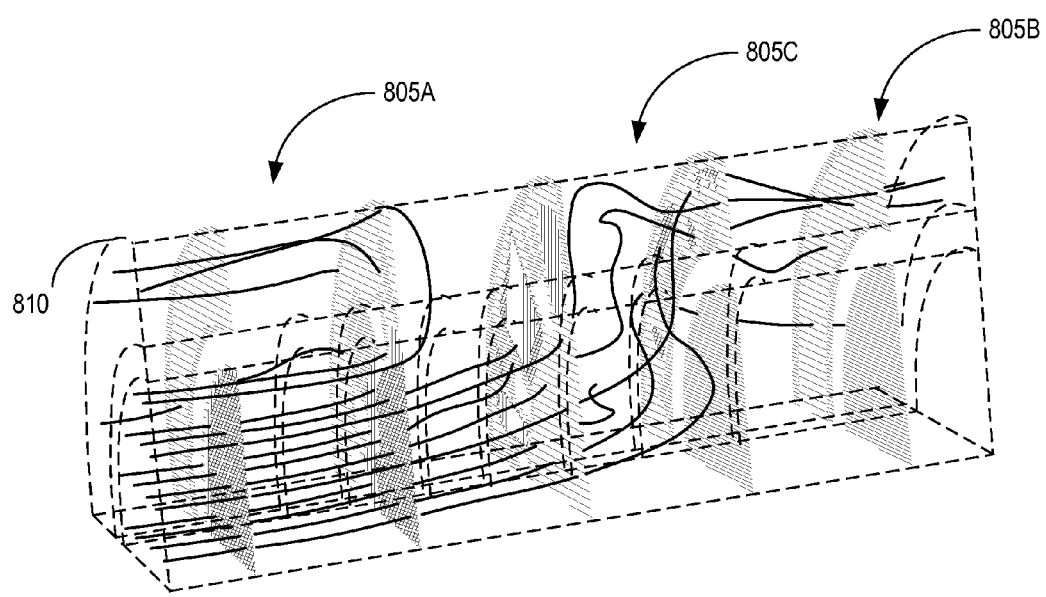
FIGS. 8A and 8B compare the flow through the system using a conventional cascade element (FIG. 8A) and an improved cascade element (FIG. 8B), in accordance with some embodiments of the present disclosure.
Figure 8B:
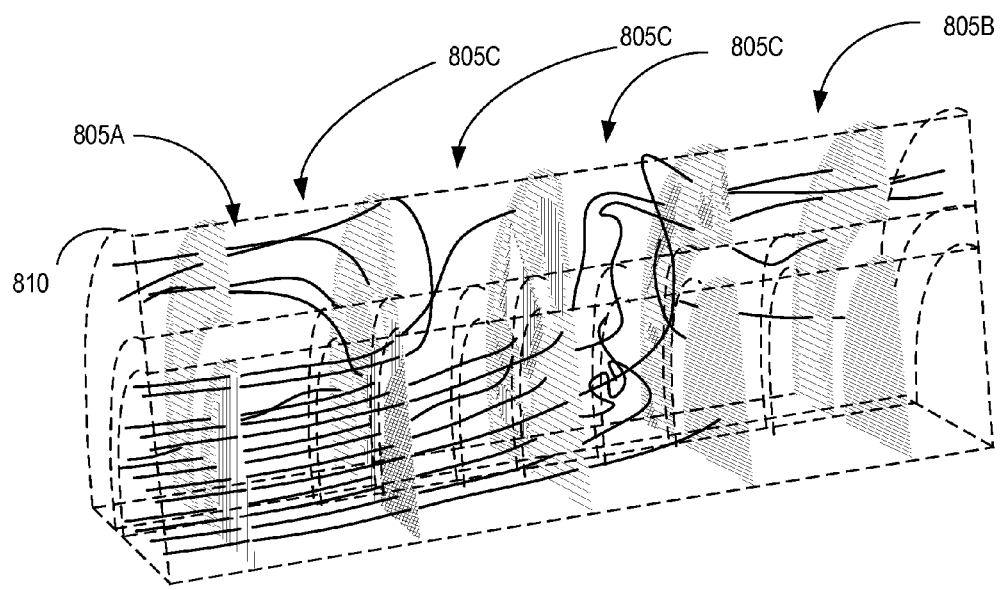

FIGS. 8A and 8B depict velocity surface plots along with streamlines to compare the flow through the cascade element with (FIG. 8B) and without (FIG. 8A) the optimized vane 500 design. As shown in FIG. 8A, as the airflow, shown in streamlines 805, passes through the cascade element 810 and a small portion of the airflow is completely reversed 805a. The remainder of the airflow 805b, however, is diverted, but ultimately continues in the same direction. In addition, there is basically only one area of high circulation 805c, which involves a relatively small number of streamlines. This lack of circulation can increase noise levels at the intersection between the fast moving airstream over the vehicle and the less energetic airflow 805c in this area.

In contrast, as shown in FIG. 8B, the addition of a sinusoidal surface pattern increases the number of streamlines 805 that are completely reversed 805a, increasing reverse thrust. Of course, the number of streamlines 805b that are temporarily diverted and then continue on in the same direction is reduced. In addition, several areas of increased mixing 805c are shown. This increased mixing reduces the shear layer turbulence between the reverser airflow 805 and the fast moving airstream over the vehicle, reducing noise. Thus, the optimized design both increases reverse thrust and reduces broadband noise from the reverser. The CFD simulation shows an increase of reverse thruster efficiency, $\eta$, from approximately 0.44 to 0.57, or a 13% increase in efficiency.

While several possible embodiments are disclosed above, embodiments of the present disclosure are not so limited. For instance, while several possible surface patterns 510, 610 have been disclosed, other suitable patterns, sizes of patterns, or orientations could be selected without departing from the spirit of the disclosure. In addition, the location and configuration used for various features of embodiments of the present disclosure such as, for example, the location, angle of attack, and/or curvature of a particular vane 410 can be varied according to a particular aircraft or application that requires a slight variation due to, for example, the size or construction of the aircraft, the engine type, bypass ratio, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

The invention claimed is:

1. A cascade element for a thrust reverser comprising:
   a first plurality of vanes, disposed in a plurality of rows, and comprising a first, raised geometric pattern on a facing surface of each vane, the facing surface comprising the first, raised geometric pattern and a recessed portion with contiguous walls transitioning the facing surface from the first, raised geometric pattern to the recessed portion and defining a plurality of peaks and a plurality of valleys of the first, raised geometric pattern;
   wherein the first, raised geometric pattern is configured to increase mixing with a first, internal airflow and a second, external airflow to reduce noise and increase reverse thrust.

2. The cascade element of claim 1, wherein the vanes in each of the plurality of rows have a different angle of attack.

3. The cascade element of claim 1, further comprising:
a second plurality of vanes disposed proximate a second end of the cascade element, and comprising a second, raised geometric pattern;
wherein the first plurality of vanes are disposed proximate a first end of the cascade element;
wherein first, raised geometric pattern and the second, raised geometric pattern are configured to increase mixing with a first, internal airflow and a second, external airflow.

4. The cascade element of claim 3, wherein:
one or more of the first, raised geometric pattern and the second, raised geometric pattern are sinusoidal patterns.

5. The cascade element of claim 3, wherein:
one or more of the first, raised geometric pattern and the second, raised geometric pattern are sawtooth patterns.

6. The cascade element of claim 3, wherein
the first plurality of vanes are disposed at a first angle of attack; and
the second plurality of vanes are disposed at a second angle of attack.

7. The cascade element of claim 6, wherein the first angle of attack is shallower than the second angle of attack.

8. The cascade element of claim 3, wherein
the first plurality of vanes comprise a first curvature; and
the second plurality of vanes comprise a second curvature.

9. The cascade element of claim 8, wherein the first curvature is smaller than the second curvature.

10. A thrust reverser comprising:
a first cascade element, disposed proximate a first end of an engine, comprising a first plurality of vanes, each of the first plurality of vanes comprising a first, raised geometric pattern on a facing surface of each vane of the first plurality of vanes, the facing surface comprising the first, raised geometric pattern and a recessed portion with contiguous walls transitioning the facing surface from the first, raised geometric pattern to the recessed portion and defining a plurality of peaks and a plurality of valleys of the first, raised geometric pattern;
a second cascade element, disposed proximate a second end of the engine, comprising a second plurality of vanes, each of the second plurality of vanes comprising a second, raised geometric pattern on a facing surface of each vane of the second plurality of vanes, the facing surface comprising the second, raised geometric pattern and a recessed portion with contiguous walls transitioning the facing surface from the second, raised geometric pattern to the recessed portion and defining a plurality of peaks and a plurality of valleys of the second, raised geometric pattern;
wherein first, raised geometric pattern and the second, raised geometric pattern are configured to increase mixing with a first, internal airflow and a second, external airflow.

11. The thrust reverser of claim 10, wherein
the first plurality of vanes are disposed at a first angle of attack; and
the second plurality of vanes are disposed at a second angle of attack.

12. The thrust reverser of claim 11, wherein the first angle of attack is smaller than the second angle of attack.

13. The thrust reverser of claim 12, wherein the first end of the engine is disposed near an intake of the engine; and
the second end of the engine is disposed near an exhaust of the engine.

14. The thrust reverser of claim 10, the first cascade element further comprising:
a third plurality of vanes comprising a third, raised geometric pattern on a facing surface of each vane of the third plurality of vanes, the facing surface comprising the third, raised geometric pattern and a recessed portion with contiguous walls transitioning the facing surface from the third, raised geometric pattern to the recessed portion and defining a plurality of peaks and a plurality of valleys of the third, raised geometric pattern.

15. The thrust reverser of claim 10, the second cascade element further comprising:
a fourth plurality of vanes comprising a fourth, raised geometric pattern on a facing surface of each vane of the fourth plurality of vanes, the facing surface comprising the fourth, raised geometric pattern and a recessed portion with contiguous walls transitioning the facing surface from the fourth, raised geometric pattern to the recessed portion and defining a plurality of peaks and a plurality of valleys of the fourth, raised geometric pattern.

16. A method comprising:
providing a first cascade element of a thrust reverser comprising a first plurality of vanes;
providing a second cascade element of the thrust reverser comprising a second plurality of vanes;
wherein one or more of the first plurality of vanes and the second plurality of vanes comprise a raised geometric pattern on a facing surface of a vane, the facing surface comprising the raised geometric pattern and a recessed portion with contiguous walls transitioning the facing surface from the raised geometric pattern to the recessed portion and defining a plurality of peaks and a plurality of valleys of the raised geometric pattern, the raised geometric pattern configured to increase mixing with a first, internal airflow and a second, external airflow.

17. The method of claim 16, wherein the raised, geometric pattern comprises a sinusoidal pattern.

18. The method of claim 16, wherein the raised, geometric pattern comprises a sawtooth pattern.

19. The method of claim 16, wherein the first plurality of vanes are disposed at a first angle of attack and the second plurality of vanes are disposed at a second angle of attack.

20. The method of claim 16, further comprising:
installing the first cascade element on an engine in a first location;
installing the second cascade element on the engine in a second location;
wherein the first location is further forward on the engine than the second location.

* * * * *